United States Patent
Schreitmueller et al.

(10) Patent No.: US 6,742,744 B2
(45) Date of Patent: Jun. 1, 2004

(54) ACTUATION MECHANISM FOR SWINGING AN AIRCRAFT DOOR

(75) Inventors: Holger Schreitmueller, Harburg (DE); Thomas Nickl, Treuchtlingen (DE); Thangaraju Nithyanandam, Donauwoerth (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 0 days.

(21) Appl. No.: 10/370,437

(22) Filed: Feb. 19, 2003

(65) Prior Publication Data
US 2003/0160131 A1 Aug. 28, 2003

(30) Foreign Application Priority Data
Feb. 20, 2002 (DE) ......................................... 102 07 033

(51) Int. Cl.[7] .................................................. B64C 1/14
(52) U.S. Cl. ........................ 244/129.5; 49/149; 49/157; 49/254; 49/255
(58) Field of Search ........................ 244/129.4; 49/149, 49/157, 254, 255

(56) References Cited

U.S. PATENT DOCUMENTS

| 5,163,639 A | 11/1992 | Herrmann et al. ....... 244/129.5 |
| 5,251,851 A | 10/1993 | Herrmann et al. ....... 244/129.5 |

FOREIGN PATENT DOCUMENTS

EP    0465785    1/1992

*Primary Examiner*—J. Woodrow Eldred
(74) *Attorney, Agent, or Firm*—Davidson, Davidson & Kappel, LLC

(57) ABSTRACT

An structurally simplified actuation mechanism for swinging an aircraft door from a frame on an aircraft fuselage. The actuation mechanism includes a cantilever rotatably mounted to the frame and including a receiving region, a universal joint supported in the receiving region, and an actuation device disposed on the cantilever. The universal joint defines a vertical axis of rotation and is configured to receive a door fitting. The actuation device includes an output drive connected to the universal joint at the vertical axis of rotation.

2 Claims, 1 Drawing Sheet

ACTUATION MECHANISM FOR SWINGING AN AIRCRAFT DOOR

CROSS-REFERENCE TO RELATED APPLICATIONS

This application claims priority to German Patent Application No. 102 07 033.4, which is incorporated by reference herein.

BACKGROUND

The present invention relates to an actuation mechanism for swinging an aircraft door. A cantilever is rotatably mounted to a frame on the fuselage side, a universal joint is supported in a receiving region of the cantilever and receives a door fitting connected to the door structure.

The aircraft door is preferably a passenger door. The movement of a door during the opening or closing operation relates to the lifting or lowering and to the swinging of the passenger door.

Such a passenger door is described in European Patent Application EP 465 785 A1. The lifting device has associated therewith an actuation device. The actuation device of the lifting device acts, via a connecting rod, on a lower door fitting, preferably an A-arm which provides the connection between the door structure and the cantilever so that the cantilever is guided upward or downward about its axis which is fixed with respect to the door, finally resulting in a lifting or lowering of the passenger door. For example, during an opening operation, the swinging of the passenger door takes place after the passenger door has been lifted.

The swinging movement of the door is produced by another actuation device. The actuation device is a program-controllable electric motor as is generally known. In the known passenger door, this actuation device for swinging is in continuous engagement with the cantilever at the output end. The actuation device itself is arranged at the door frame on the fuselage side. A power transmission means having a complex design runs from the output drive to a door fitting, preferably an A-arm, which is connected to the door structure.

This solution requires additional fastening means for attaching the actuator to the frame on the fuselage side. At the same time, the means for transmitting power to the support arm must allow the lifting or lowering movement of the cantilever with the passenger door. Therefore, the power transmission means requires a special structural design. This also requires appropriate procedures for adjustment with respect to the actuator.

SUMMARY OF THE INVENTION

An object of the present invention is to structurally further simplify the swinging of a passenger door which is supported and guided by a cantilever, reducing the required number of components for mounting the actuation device for swinging and the power transmission thereof.

The present invention provides an actuation device for swinging an aircraft door pivoted to a cantilever, the cantilever being rotatably mounted to a frame on the fuselage side, the cantilever further having a universal joint which is supported in a receiving region and receives a door fitting connected to the door structure. The actuation device (5) for swinging is arranged on the cantilever (1), and the output drive of the actuation device (5) is connected to the vertical axis of rotation (E) of the universal joint (3) supported in the receiving region (2) of the cantilever (1).

The output drive of the actuation device (5) may be connected to a gear which is connected to the vertical axis (E) of the universal joint (3).

On the fuselage side, the cantilever of the passenger door is supported on the frame on an axis of rotation. On the door side, the cantilever features two receiving regions which each have a universal joint supported therein. Linked to each of the universal joints is a door fitting, a generally known A-arm, which is rotatable about a horizontal axis which is fixed with respect to the door. The A-arm is connected to the door structure. The output drive of the actuator for swinging the passenger door is directly (i.e., by the shortest possible path) connected to the axis segment located on the vertical axis of the universal joint by means of a power transmission means (e.g., a gear). This relates to one universal joint. In this manner, a torque is transmitted from the actuator to the universal joint, the universal joint rotating about its vertical axis and transmitting this torque directly to the door structure via the A-arm. In the process, the actuator supports itself against the cantilever by a suitable connection. The actuator can be a program-controllable electric motor, other forms of energy being possible as well, for example, a hydraulic motor or a compressed-air motor. The actuator can also be used for swinging the passenger door in case of an emergency opening.

However, the functionality of "swinging the passenger door as a comfort function" and the functionality "swinging the passenger door during emergency opening" can also be separated and covered by two systems that are different from each other.

In this case, provision must be made for the possibility of mechanically separating the emergency opening operation from the swing actuator to allow each system to operate autonomously and to eliminate the possibility of mutual interference. This could be accomplished, for example, by a mechanism (coupling) integrated into the swing actuator as well as by an externally acting device.

Using the present invention, a change in position of the actuator away from the frame on the fuselage side to an axis that is closer to the passenger door has been achieved. Advantageously, the output drive of the actuator is integrated in the axis of rotation of the passenger door. In this manner, the power transmission path is considerably shortened.

The present invention advantageously eliminates the need for fastening means for the actuator on the frame on the fuselage side, which were required in known methods heretofore, as well as the need for complex power transmission means from the position of the frame on the fuselage side to the cantilever, which were heretofore required to allow the relative movement of the actuator for swinging during the lifting or lowering operation. The connection according to the present invention between the actuator for swinging and the universal joint is not subject to stress resulting from the lifting or lowering of the door. This constitutes an advantage.

There is no need for an adjustment of this actuator for swinging. An additional adjustment of the actuator with respect to the universal joint or to the A-arm is not required.

A further advantage lies in the fact that the functionalities of "emergency opening" and "swinging" can be dealt with separately. Thus, for example, it would be possible to retrofit already existing passenger doors with this actuator without affecting any safety functions that are relevant for approval.

BRIEF DESCRIPTION OF THE DRAWING

In the following, the present invention is explained in greater detail with reference to a drawing of an exemplary embodiment, in which.

DETAILED DESCRIPTION

Figure 1:
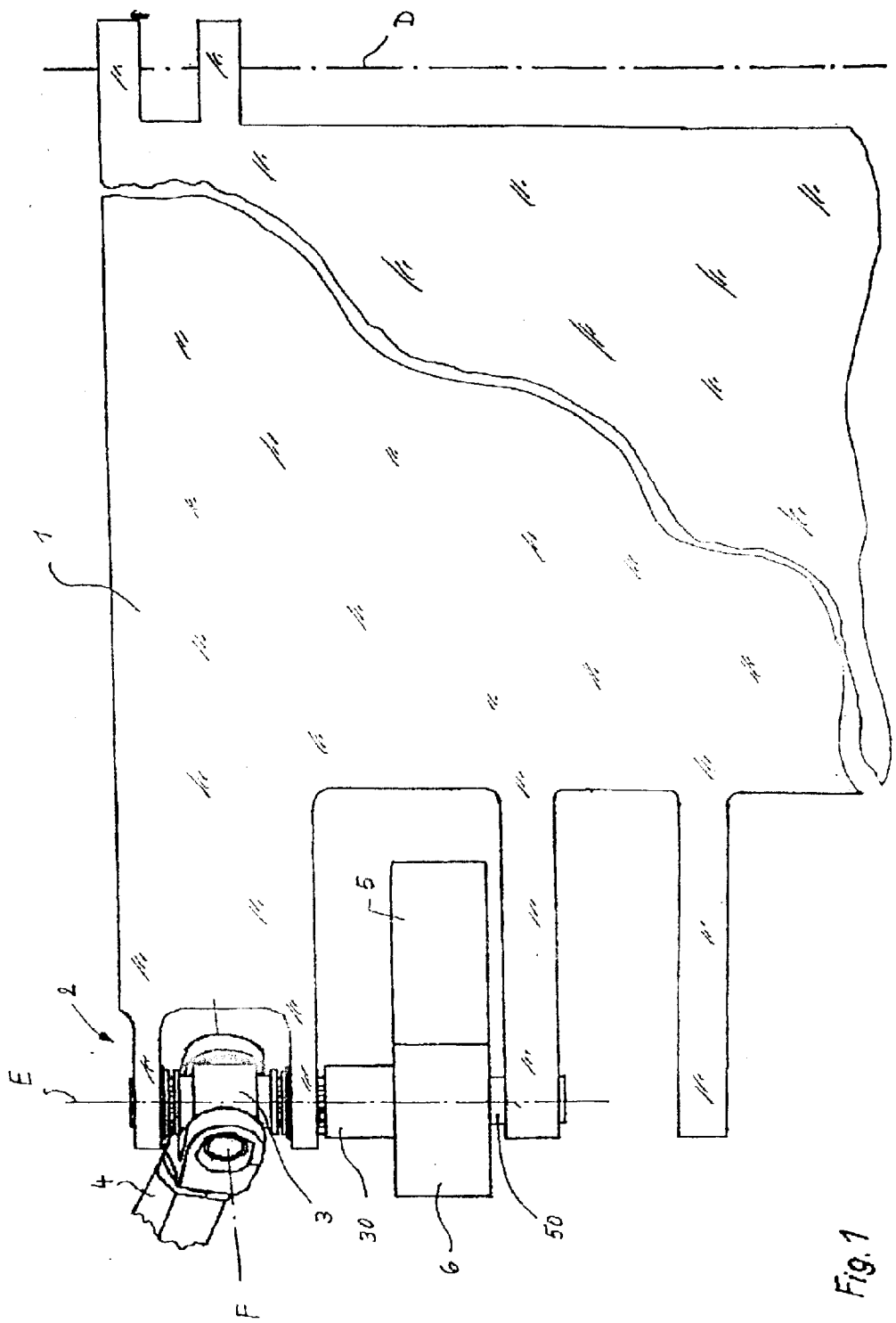
FIG. 1 shows a detail of a cantilever for a passenger door including the arrangement of the actuator for swinging according to the present invention.

On the fuselage side, cantilever 1 of the passenger door (not shown) is supported on the frame on an axis of rotation D. On the door side, cantilever 1 features two receiving regions which each have a universal joint supported therein. The detail of the cantilever depicts a receiving region 2 which constitutes a fork-shaped cutout on cantilever 1. The other receiving region is not shown. A universal joint 3 is supported in receiving region 2 in the direction of its vertical axis E. (Upper) A-arm 4 is supported on horizontal axis F of universal joint 3. A-arm 4 is connected to the door structure (not shown). Actuator 5 for swinging the passenger door is connected, by the shortest possible path, to axis segment 30 located on vertical axis E of universal joint 3 by means of a power transmission means 6. In this manner, a torque can be transmitted from actuator 5 to universal joint 3; universal joint 3 rotating about its vertical axis E and transmitting this torque directly to the door structure via A-arm 4. In the process, actuator 5 supports itself against cantilever 1 with a rigid connection 50.

The present invention has the advantage that swing actuator 5 is arranged in the immediate vicinity of axis of rotation E.

Axis E corresponds to a hinge axis which is located on the door side and in which is integrated the swing actuator. This has the advantage that no additional positional movement of the swing actuator is required during the lifting of the door. A target with a contour is positioned at a guiding coulisse installed in the frame, allowing (torque) control of the swing actuator via a sensor located on the door side.

The sensor can also be positioned at the lowering protection of the door since in this door fitting position, the absolute position of the door relative to the door frame can be measured as well. Moreover, the relative door position can also be determined by an angular-position sensor on the actuator, which is possible because the actuator is in a continuous positive fit with the door.

Compared to the prior art, the number of components (power transmission means) could be markedly reduced due to the elimination of the interface to the frame on the fuselage side. The adjustment thereof is eliminated as well. Moreover, no components are required for adjustment with respect to the lifting and lowering of the passenger door. A simple motor control (torque control) for the swinging is possible because of the continuous positive fit (positive control) between the actuation device and the hinge axis on the door side.

Due to the continuous positive fit, the actuator for swinging is in engagement with the axis of rotation also during the lifting of the door. Nevertheless, no additional adjustability of the door is required.

What is claimed is:

1. An actuation mechanism for swinging an aircraft door from a frame on an aircraft fuselage, the actuation mechanism comprising:

a cantilever for supporting the aircraft door, the cantilever rotatably mounted to the frame and including a receiving region;

a universal joint supported in the receiving region, the universal joint defining a vertical axis of rotation and configured to receive a door fitting; and an actuation device disposed at the cantilever and including an output drive connected to the vertical axis of rotation of the universal joint.

2. The actuation mechanism as recited in claim 1 further comprising a gear connected to the output drive of the actuation device and to the vertical axis of the universal joint.

* * * * *